Figure 1:
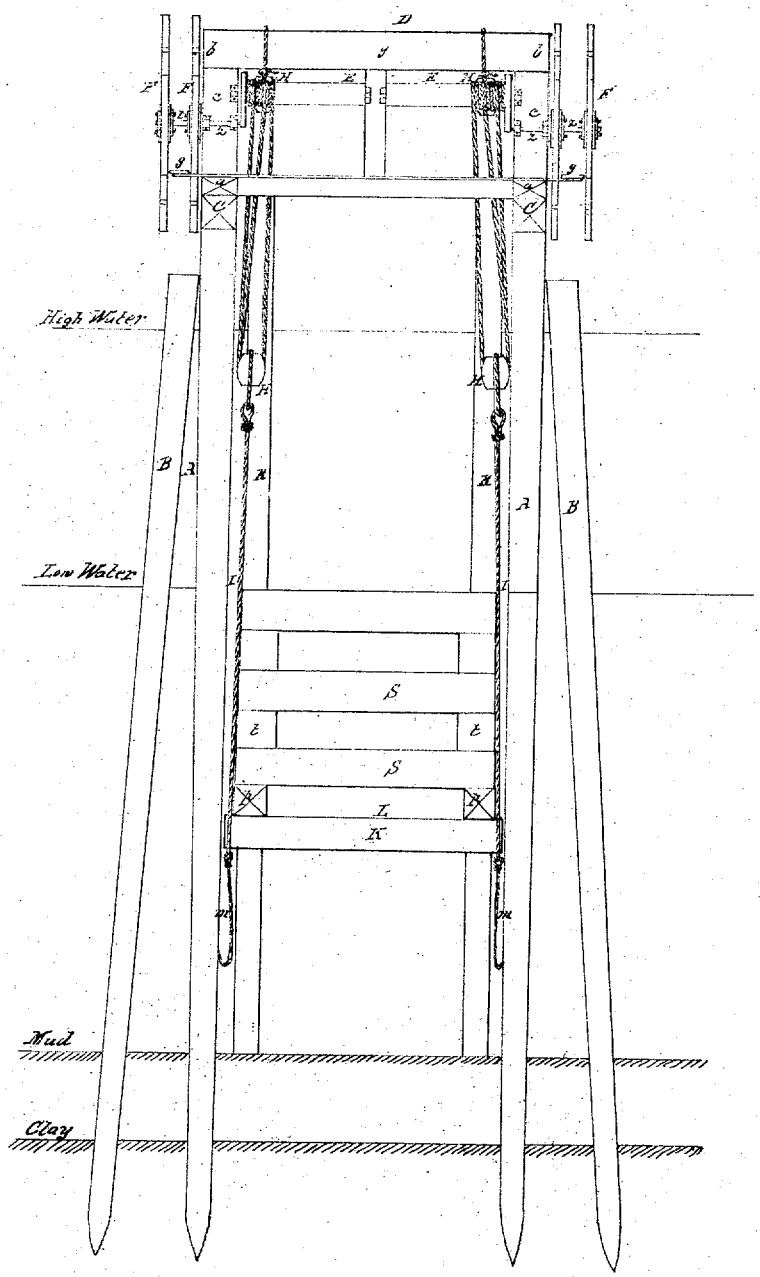

The digital Rc[illegible] [illegible] on demand.

7778X (2 Sheets) Sheet 1

H. R. May
Building Walls in deep Water
Patented Sept. 23d 1833

7778X
(2 Sheets Sheet 2.)
H. R. May
Building Walls in deep Water
Patented Sept. 23d 1833
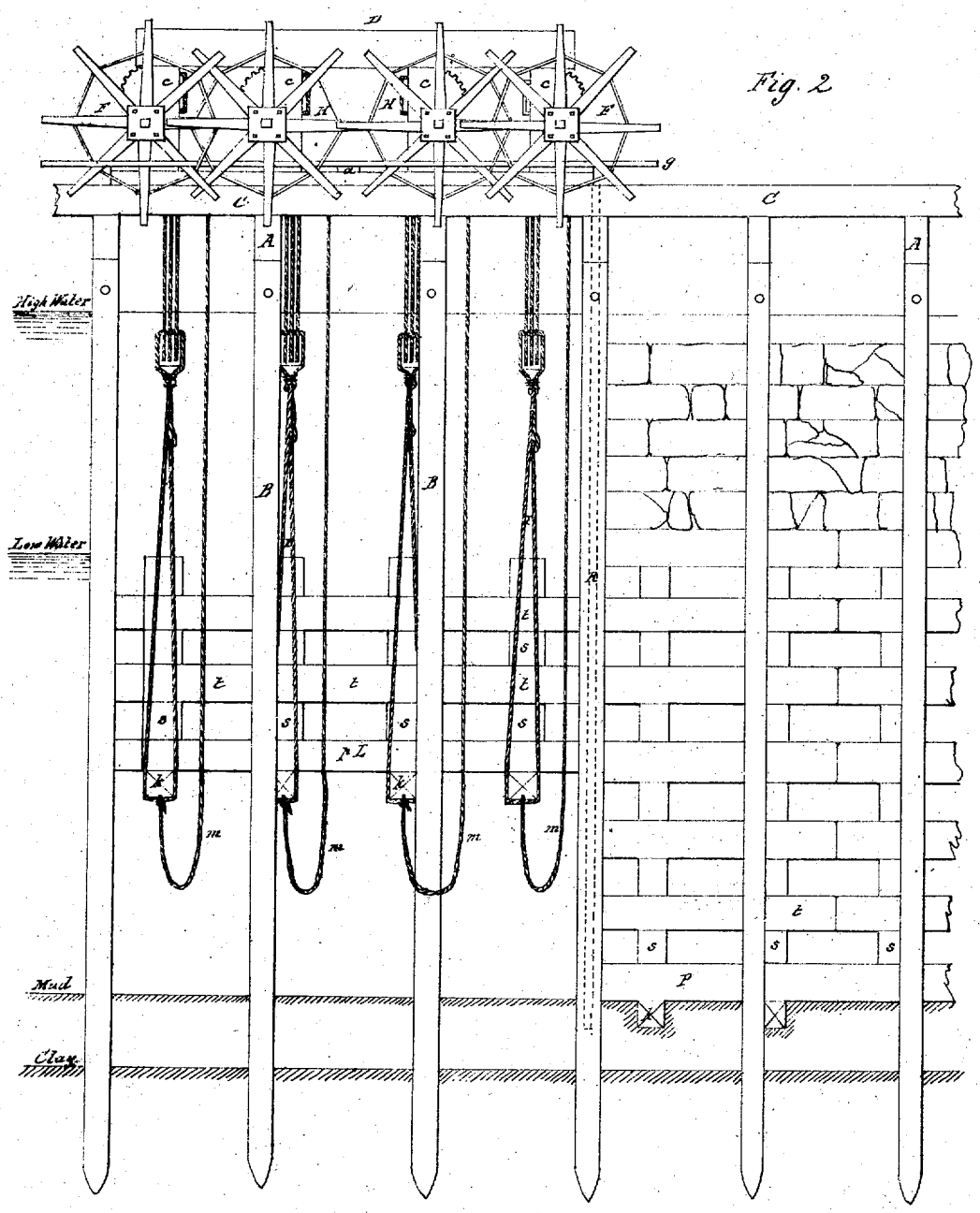

9/23/1833 7778X

[illegible] 23 1833 [illegible]

Henry H. May
Letters Patent.

The Schedule referred to in these Letters Patent and mak-
ing part of the same containing a description in the words of the
said Henry H. May himself of his Improvement in Building
Walls in Deep Water Know all men by these Presents That I Henry H. May of the City of Boston in the County of Suffolk,
& Commonwealth of Massachusetts Gentleman, have invented made & ap-
plied to use, a new & useful improvement in the mode of constructing walls
& masonry in deep water not known or used before this my invention which
said invention, & the principles thereof & the mode in which I have contem-
plated its application with the manner of using the same are as fol-
lows to wit. 1st I drive in the usual way or by any convenient
means a row or line of piles, each pile being driven at a suitable distance
from the other, upon one side of the space on which the wall is to be
erected or the masonry done. 2d I drive as aforesaid another or
second row of piles each one of which being driven on the other side of
the space aforesaid but opposite to & in a direction parallel to the first
row or line of piles. 3d The two rows or lines of piles being placed or driv-
en as aforesaid on the two sides of said space opposite & parallel to each
other. I strengthen & sustain them in their proper positions by driving
& placing spur shores diagonally to every pile or every other one in the rows,
properly fixing & securing them on the outward sides of the piles & plac-
ing the lower ends of the same at a suitable distance from the foot of
each or every other pile, they being fastened by bolts or otherwise, at or near
the tops of the piles to the same on the outward side. 4th I [illegible]
the [illegible] each of said rows or lines of piles driven & secured as
aforesaid — to apply upon the tops of each row [illegible] by any convenient means
a [illegible] of sufficient strength & dimensions & extending from one
end of each row of piles to the other end of the same [illegible]

two level caps, or parallel lines of rail. 5th. I construct a frame of
suitable form, size & materials containing windlasses with their
shafts, key-wheels, pinions & supporters or platform for the workmen
who may be employed to work the apparatus & machinery.
6th. I place this frame with its machinery & apparatus upon the caps
or rails aforesaid so that the said frame with its machinery & apparatus
may be moved backwards & forwards, or along & upon said rails or caps as oc-
casion may require. The platforms or supporters for the workmen, & the
purchase or arms wheels of the windlasses being above on the outward
sides or extending beyond the said rows or lines of piles, & the other parts of
said machinery & apparatus being above between the two rows of piles afore-
said. 7th. I construct a platform of transverse & longitudinal timbers of
sufficient strength & dimensions placing the longitudinal timbers upon
the transverse ones at right angles with them within about four inches
of the ends of the same, & fasten them together with trenails or in any other
suitable way, the length of the transverse timber being about equal to
the width of the space to be filled up between the rows of piles aforesaid;
& the longitudinal timbers extending as far as may be necessary for the con-
struction of any section of the wall or masonry to be built; against the
ends of said longitudinal timbers, I fasten planks perpendicularly to them with
spikes which serve as guides in its passage downwards for the second section
of the wall or masonry to be built. 8th. This platform I place be-
tween the two rows of piles & beneath the windlass frame & in such a man-
ner that the transverse timbers shall be across & over the space to be built up-
on, while the longitudinal timbers extend along the said space in lines par-
allel to the two rows of piles aforesaid & here over the water of said space, be-
tween said rows of piles I sustain the aforesaid platform by means of
ropes or slings; the loops of which being placed around the under side of the
ends of said transverse timbers while the other ends of said ropes or slings
are fastened to the blocks belonging to the windlasses aforesaid.
9th. The platform of transverse & longitudinal timbers being thus made,
placed & firmly held over the space to be filled up or whereon the wall
or masonry is to be constructed between the two parallel lines or rows of piles as aforesaid. I place upon said platform alternate courses of stone in the form & manner of headers & stretchers with interstices between them the first course of headers being or resting upon the longitudinal timbers directly over the transverse timbers of the platform & the first course of stretchers resting upon the ends of the headers directly over to the longitudinal timbers, the second & remaining courses of headers & stretchers resting upon each other over the former courses so that interstices are left between the stones, which after the platform has been lowered into its place are filled with rubble or large stones & as fast as the work progresses I lower the same into the water by the means of the windlass & apparatus aforesaid. & this I continue to do until the platform rests on the bottom & the wall rises as high as low water mark & then the ropes or slings are drawn off of the ends of the transverse timbers by means of tripping ropes connected with said ropes or slings for the purpose, & the remaining or upper part of the wall is finished in the usual or any convenient way. 10th One Section of the said wall being thus completed, I move the windlass frame with its apparatus along the side rails until it comes to the end of the platform & section of wall already so built, & proceed to construct, place & sustain another platform of transverse & longitudinal timbers as aforesaid, & this also is furnished with alternate courses of headers and stretchers as aforesaid, I lower this second platform down in the manner above described until it sinks to the bottom of said space to be filled up: the planks at the end of the first platform serving as a guide for the second, & those of the second as a guide for the third & so on. And in this manner I construct platform after platform & section after section, until the entire wall or masonry upon the space between the two rows of piles aforesaid shall be done & completed. It is obvious that the windlass frame, platform of transverse & longitudinal timbers with the other machinery, Apparatus & fixtures aforesaid must be varied in number & dimensions according to the nature & extent of the space, on which the wall or masonry is to be constructed. The description above given may perhaps be better understood by reference to the drawing hereto annexed & the explanation of the same which is as follows to wit. Figure 1 exhibits an end view of

1118X the two rows of piles the windlapes platform & machinery & apparatus fig[illegible] being a side view of the same. A.A. Are rows of piles driven paral-lel to each other between which the wall is to be built with a space suffi-cient to allow the platform L. to pass down between them, [illegible], B.B. Are spur shores on the external sides of the piles A.A. which serve to strengthen and support them. C.C. Are caps to the two rows of piles A. A. on which the frame D. is made to move forward & backward as occasion may require. D. Is the frame of the principal machinery & is composed of two outward longitudinal sills a.a. and four transverse sills y. y. y. y. suitably connected together by mortises & tenons, & two outward upper longitudinal beams b. b. resting upon the tops of the posts c.c.c.c. & secured to them by mortises & tenons & the posts c.c.c.c. rest upon the outward longitudinal sills a.a. perpendicularly & are secured to them by mortises & tenons Y.Y. are transverse cross ties resting on the tops of the posts c.c.c.c. & mortised & tenon-ed at their ends into the longitudinal beams b. b. The frame D. may be varied in its dimensions & in the number of its sills, beams & posts accord-ing to the dimensions of the wall to be constructed & other circumstances. E.E. Are common windlapes having journals at each of their extrem-ities which revolve in boxes affixed to post c.c. The outward ends of said windlapes have attached upon their journals or shafts cog wheels of proper size which are acted upon & turned round by the teeth of pinions fixed upon the ends of the shafts e.e. of the armed or purchase wheels F.F. which shafts revolving in proper bearings affixed to the posts c.c.c.c. have upon their opposite ends a set of purchase arms by which the work-men operate the machinery). I use four purchase or armed wheels F.F. F.F. on each side of frame D. but every other one of the series is attached to a shaft the end of which extends beyond the outward side of the frame D. a sufficient distance, not to interfere in their movements with each other & to allow the workmen to pass forward & backward on a supporter or platform g. placed in the space between the purchase wheels nearest to the frame D. and those farthest from it. The number of the wheels & shafts with the gearing and arrangement may however be more varied & the same purpose answered. g. Is a plank [illegible] supporter extending along the the outward side of the frame D in the space between the purchase
wheels F F nearest to the frame D and the purchase wheels F F farthest
from it properly fixed & arranged for the workmen to stand upon who work
the machinery, or purchase wheels. H H. Are common treble purchase
blocks, one of which in the set is attached, or suspended from the [illegible]
[illegible] G & connected in its operation, in the usual way, to the other of
the same set by a rope. One end of said rope is fixed to the wind lass so that
the rope is wound upon, or unwound from the same, as the purchase wheel
F is moved forward or backwards, but different blocks, or a greater or less
number may be used & the gearing or wheels varied & the same effects
obtained. To the lower block of the set H is attached a rope I (called
a sling rope) which passes around the outward end of the transverse sill or
timber K. of the platform L (and serves to sustain the platform.
At the lowermost point of the sling rope I is attached a rope m cal-
led a tripping rope which serves when pulled to detach the sling rope I
from the transverse timber K after the platform L has been let down to
its bed or bearing on the mud or clay on the bottom. When the sling rope
I cannot be thus detached, as sometimes is the case, from the end of the
transverse timber K by the tripping rope m, in consequence of some ob-
stacle on the bottom near the end of said timber, the sling rope may be
removed by unfastening the lashing which is properly fixed for the purpose
& then drawing the sling rope from beneath the timber in a direction at
right angles to it. I use on each side of the frame D four windlasses
& four sets of blocks, with suspension sling & tripping ropes, as above described,
with the gearing & arrangements as aforesaid, but the number as well
as the gearing & arrangements may be varied & the same effects accomplished.
L. Is the platform on which the wall or masonry is to be laid. It is
composed of longitudinal timbers p, p, p, p, placed parallel to each
other, & transverse timbers o, o, o, o, more or less, underneath the longitudin-
al timbers and [illegible] to which, or otherwise suitably connected to them, the length
of the transverse timbers being somewhat greater than the width of the wall
to be built, & the length of the long[illegible] timbers [illegible] the bottom
of the wall or [illegible] to be built [illegible]. R is a plank 1178x called the guiding planks [illegible] [illegible] across the ends of the longitu-
dinal timbers p.p.p. perpendicular to them, which serve as a guide to the
several sections of the wall or masonry to be built. Every thing being
constructed, placed & arranged as herein before described. I build my
wall or masonry as follows to wit. I place a course of headers S.S.S.S.
so that they may rest upon the longitudinal timbers p.p. of the platform
L. directly over the transverse timbers e. e. e. e. of the same platform. I then
place a course of stretchers t. t. so that they may rest upon the ends of the
headers S.S.S.S. directly over the longitudinal timbers p.p.p. & then place
another course of headers as before & then another course of stretchers: each
row of headers & stretchers resting upon each other over the preceding course;
placing the materials in such a manner that interstices are left between
them which interstices are after the platform L. has been lowered into its
place, filled up with rubble or any other materials suitable for the purpose.
As the work progresses the platform L. is lowered from time to time by
workmen placed on the supporters g. & turning the purchase wheels F.F. &c
& this is continued to be done till the platform L. with the wall or mason-
ry as above described is constructed upon it, descends to the bottom,
or finds its bed or bottom in the mud or clay & the wall or masonry
reaches as high as low water mark. I then detach the sling ropes
I.I. from the ends of the transverse timbers K.K. by means of the tripping ropes
m. m. & move the frame D. with its machinery, apparatus, & fixtures, along
the ways C.C. till it is even with the guiding planks R.R. & proceed
to construct another platform L. as before described for another section
of the wall or masonry to be built, which I build & construct as afore-
said. And so on till the whole of the contemplated wall or masonry
is completed in height as far as low water mark. & afterwards I finish
in the usual manner. And although I may have herein described
machinery & parts of machinery which have been known and used before this
my invention, yet I hereby nevertheless explicitly declare that what is
hereby claimed by me, as my invention is the mode herein before describ-
ed of constructing walls & masonry in deep water & the adaptation &
arrangement of the machinery & apparatus, as herein before particularly

1118X

[illegible] for accomplishing the same.

In testimony that the foregoing is a true specification of my said improvement in the mode of constructing walls & masonry in deep water with the mechanical contrivances & mode of operating the same as herein described, I have hereto set my hand this 10th day of July in the year of our Lord eighteen hundred & thirty three.

Witnesses
Robert H. Eddy
John McCullum

Henry H. May [illegible]
[illegible]

( Do in portfolio )

2800 word